United States Patent
Matsunaga

(10) Patent No.: US 10,960,877 B2
(45) Date of Patent: Mar. 30, 2021

(54) OBJECT DETECTION DEVICE AND OBJECT DETECTION METHOD

(71) Applicant: DENSO CORPORATION, Kariya (JP)

(72) Inventor: Shogo Matsunaga, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 305 days.

(21) Appl. No.: 16/062,522

(22) PCT Filed: Nov. 28, 2016

(86) PCT No.: PCT/JP2016/085097
§ 371 (c)(1),
(2) Date: Jun. 14, 2018

(87) PCT Pub. No.: WO2017/104387
PCT Pub. Date: Jun. 22, 2017

(65) Prior Publication Data
US 2018/0370531 A1 Dec. 27, 2018

(30) Foreign Application Priority Data
Dec. 17, 2015 (JP) .............................. JP2015-246691

(51) Int. Cl.
*G01S 13/58* (2006.01)
*G06K 9/00* (2006.01)
(Continued)

(52) U.S. Cl.
CPC ......... *B60W 30/0956* (2013.01); *B60R 21/00* (2013.01); *B60W 30/08* (2013.01);
(Continued)

(58) Field of Classification Search
CPC ............ B60W 30/0956; B60W 30/08; B60W 2554/80; B60W 2554/00; B60W 30/09;
(Continued)

(56) References Cited

U.S. PATENT DOCUMENTS

2004/0093160 A1* 5/2004 Knoop ................... G01S 13/93
701/301
2007/0027597 A1 2/2007 Breuel et al.
(Continued)

FOREIGN PATENT DOCUMENTS

JP 2010-092180 A 4/2010
JP 2012-048460 A 3/2012
(Continued)

*Primary Examiner* — Genna M Mott
(74) *Attorney, Agent, or Firm* — Maschoff Brennan

(57) ABSTRACT

An object detection device detects an object moving in the area surrounding an own object. The object detection device includes: an information obtainment unit which obtains an object speed value that is at least one of a speed and an acceleration of the object in a lateral direction which is orthogonal to a predetermined direction of the area surrounding the own object; and an upper limit setting unit which sets an upper limit of the object speed value on the basis of angle information that is the relationship indicating an angle of a moving direction of the object with respect to the predetermined direction.

15 Claims, 6 Drawing Sheets

(51) Int. Cl.
*B60W 30/095* (2012.01)
*B60R 21/00* (2006.01)
*B60W 30/08* (2012.01)
*G06K 9/62* (2006.01)
*G01S 13/931* (2020.01)
*G01S 13/72* (2006.01)
*G01S 7/41* (2006.01)
*B60W 40/04* (2006.01)
*G08G 1/16* (2006.01)

(52) U.S. Cl.
CPC .............. *B60W 40/04* (2013.01); *G01S 7/415* (2013.01); *G01S 13/58* (2013.01); *G01S 13/72* (2013.01); *G01S 13/931* (2013.01); *G06K 9/00805* (2013.01); *G06K 9/6202* (2013.01); *G08G 1/166* (2013.01); *B60W 2554/80* (2020.02); *G01S 2013/9315* (2020.01)

(58) Field of Classification Search
CPC ...... B60W 30/095; B60R 21/00; G01S 13/58; G06K 9/6202; B60T 2201/022
See application file for complete search history.

(56) References Cited

U.S. PATENT DOCUMENTS

2011/0246156 A1    10/2011  Zecha et al.
2014/0297171 A1*   10/2014  Minemura .............. B60R 21/34
                                                          701/301
2017/0327112 A1*   11/2017  Yokoyama ......... G06K 9/00335

FOREIGN PATENT DOCUMENTS

| JP | 2012-513651 A | 6/2012 |
| JP | 2012-146146   | 8/2012 |
| JP | 2014-191664 A | 10/2014 |

* cited by examiner

OBJECT DETECTION DEVICE AND OBJECT DETECTION METHOD

CROSS REFERENCE TO RELATED APPLICATIONS

This application is based on and claims the benefit of priority from earlier Japanese Patent Application No. 2015-246691 filed Dec. 17, 2015, the description of which is incorporated herein by reference.

BACKGROUND

Technical Field

The present disclosure relates to an object detection device and an object detection method for detecting an object present around an object on which the object detection device is mounted.

Background Art

Conventionally, there is a pre-crash safety (hereinafter referred to as PCS) system for reducing or preventing damage due to collision between a vehicle and objects such as other vehicles, pedestrians, and road structures located ahead of the vehicle in the travel direction thereof by detecting the location of the objects. The PCS system provides a region having a predetermined width ahead of a vehicle in the travel direction thereof, and assuming that there is a risk of collision between the vehicle and an object located within the region, calculates time to collision (TTC), which is estimated time for the vehicle to collide with the object, on the basis of the relative distance between the vehicle and the object and the relative velocity or the relative acceleration. On the basis of the time to collision, the PCS system alerts the driver of the vehicle of an approach by an alarm device or actuates a braking device of the vehicle, for example.

Exemplary devices relating to the PCS system include a driving support device disclosed in Patent Literature (PTL) 1. The driving support device disclosed in PTL 1 detects the speed of an object cutting across in front of a vehicle in the travel direction thereof, and increases the width of a region provided ahead of the vehicle in the travel direction thereof on the basis of the speed. When the object enters the region, the driving support device determines that the condition for actuating a safety device is satisfied.

CITATION LIST

Patent Literature

[PTL 1] JP 2012-048460 A

Since there is a risk of collision with not only an object moving ahead of the vehicle in the same direction as the vehicle and an object cutting across in front of the vehicle, but also an object located diagonally forward of the vehicle and cutting in front of the vehicle, the PCS system is required to cover such an object as a criterion to be used for actuating an alarm device, a braking device, etc. In order to determine whether or not such an object is cutting in front of the vehicle, it is necessary to obtain the lateral speed, the lateral acceleration, etc., of the object and expand the region to be used for actuating the safety device as the lateral speed, the lateral acceleration, etc., increase. Meanwhile, when the lateral speed, the lateral acceleration, etc., of the object is detected, there are cases where a value greater than an actual value is detected due to a detection error. In this case, if the width of the region is set on the basis of such lateral speed, lateral acceleration, etc., unnecessary actuation of the safety device may occur.

SUMMARY

The present disclosure provides an object detection device and an object detection method in which at least one of the speed and the acceleration of an object can be appropriately obtained.

According to the first aspect of the present disclosure, an object detection device which detects an object moving in an area surrounding an own object includes: a speed obtainment unit which obtains an object speed value that is at least one of a speed and an acceleration of the object in a lateral direction which is orthogonal to a predetermined direction of the area surrounding the own object; and an upper limit setting unit which sets an upper limit of the object speed value on the basis of angle information that is a relationship indicating an angle of a moving direction of the object with respect to the predetermined direction.

The speed and the acceleration of the object moving in the area surrounding the own object can be decomposed as a speed and an acceleration in the predetermined direction of the area surrounding the own object and a speed and an acceleration in the lateral direction which is orthogonal to the predetermined direction. Accordingly, when the relationship indicating the angle formed between the moving direction of the object and the predetermined direction is obtained, the upper limit of the possible value of the object speed value which is at least one of the speed and the acceleration in the lateral direction is determined. With the abovementioned configuration, as a result of setting the upper limit of the object speed value in accordance with the relationship indicating the angle of the moving direction of the object with respect to the predetermined direction, the object speed value can be controlled to be not greater than the upper limit even when a value greater than the possible upper limit value is obtained as the object speed value.

BRIEF DESCRIPTION OF THE DRAWINGS

These and other objects, advantages and features of the present disclosure will become more apparent from the following detailed description taken in conjunction with the accompanying drawings, in which.

DESCRIPTION OF THE EMBODIMENTS

An object detection device according to the present embodiment functions as a PCS system which is mounted on a vehicle, detects an object present in the area surrounding the vehicle, such as the area ahead in the travel direction thereof, and performs control to avoid collision with the object or reduce damage due to the collision.

Figure 1:
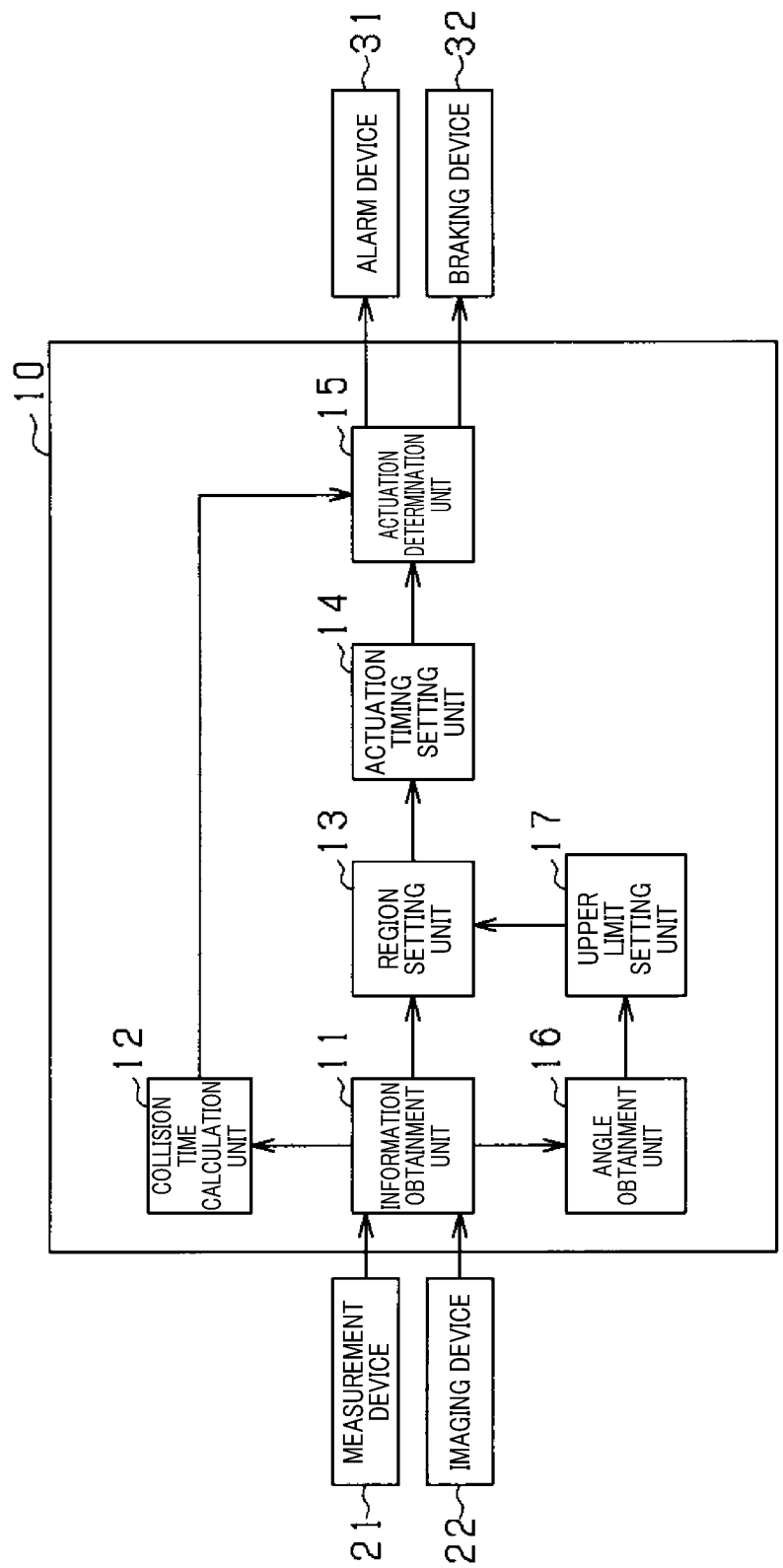
FIG. 1 is a block diagram showing a configuration of an object detection device according to the present embodiment.

In FIG. 1, an object detection device 10 is configured of a computer including a central processing unit (CPU), a read only memory (ROM), a random access memory (RAM), an input/output (I/O), and so on. This object detection device 10 implements these functions by the CPU executing a program installed in the ROM.

As a sensor device which inputs various detection information, a measurement device 21 and an imaging device 22 are connected to the object detection device 10.

The measurement device 21 is, for example, a known millimeter-wave radar which transmits a high-frequency signal in a millimeter-wave band as transmission waves. The measurement device 21 is provided at a front end of the vehicle, defines a detection range in which an object in a region within a predetermined detection angle can be detected, and detects the location of an object within the detection range. Specifically, probe waves are transmitted to an object on a predetermined cycle and waves reflected from the object are received by a plurality of antennas. The distance to the object is calculated using a point in time when the probe waves are transmitted and a point in time when the reflected waves are received. Furthermore, a relative speed is calculated using the frequency of the waves reflected from the object which have changed by the Doppler effect. In addition, the direction of the object is calculated using a phase difference of the reflected waves received by the plurality of antennas.

Note that if the location and the direction of the object are successfully calculated, the relative location of the object to the vehicle can be identified. In each predetermined period, the measurement device 21 transmits the probe waves, receives the reflected waves, calculates the reflection location and the relative speed, and transmits the calculated reflection location and relative speed to the object detection device 10 as first detection information.

The imaging device 22 is, for example, a single-lens imaging device such as a charge-coupled device (CCD) camera, a complementary metal-oxide semiconductor (CMOS) image sensor, or a near-infrared camera. The imaging device 22 is provided at a predetermined height at the middle in the direction of the vehicle width of the vehicle and captures an image of a region spread ahead of the vehicle over a predetermined angle range, from a downward view point. The imaging device 22 extracts a feature indicating the presence of the object from the captured image. Specifically, on the basis of luminance information of the captured image, the imaging device 22 extracts an edge feature and performs the Hough transform on the extracted edge feature. In the Hough transform, for example, a point on a straight line on which edge features are continuously arranged or a point at which such straight lines intersect at a right angle with each other is extracted as the feature. Note that in each control period that is the same as or different from that for the measurement device 21, the imaging device 22 captures the image, extracts the feature, and transmits the result of extracting the feature to the object detection device 10 as second detection information.

The vehicle includes an alarm device 31 and a braking device 32 as safety devices that are driven according to a control command from the object detection device 10.

The alarm device 31 is, for example, a speaker or a display installed in the interior of the vehicle. When the object detection device 10 determines that there is an increased possibility of collision with an obstacle, the alarm device 31 informs the driver of a danger of collision by outputting warning sound, a warning message, etc., according to the control command from the object detection device 10.

The braking device 32 is a stopping device that puts a brake on the vehicle. When the object detection device 10 determines that there is an increased possibility of collision with an obstacle, the braking device 32 is actuated according to the control command from the object detection device 10. Specifically, the braking device 32 increases braking force applied through a braking operation of the driver (brake assistance function) or automatically puts a brake if the driver has not performed the braking operation (automatic brake function), for example.

An information obtainment unit 11 obtains first detection information from the measurement device 21 and obtains the second detection information from the imaging device 22. Subsequently, the information obtainment unit 11 associates, as the same object, closely located objects based on a first location that is a location obtained from the first detection information and a second location that is a feature obtained from the second detection information. When the second location is close to the first location, it is highly likely that the object is actually present in the first location. This state in which the location of the object can be obtained with accuracy by the measurement device 21 and the imaging device 22 is called a fusion state. Regarding the object determined as being in the fusion state, whether or not the object is continuously in the fusion state is determined by referring to a detection history. Then, when the object is determined as being continuously in the fusion state, the object is determined as being present in that location. When the object in the fusion state enters into a state in which the object is not detected, the information obtainment unit 11 refers to the detection history and deals with the object as being present in the past location for a predetermined period.

Regarding the object determined as being in the fusion state, pattern matching using a pattern prepared in advance is performed on the second detection information. Subsequently, a type is associated with the object. At this time, examples of the type of the object include automobiles, motorcycles, bicycles, pedestrians, and various road structures. Note that motorcycles and bicycles may be collected as two-wheelers.

Subsequently, the information obtainment unit 11 associates, for each object, the relative location and the relative speed to the vehicle. As this relative location, a lateral location indicating a relative distance in a direction orthogonal to the travel direction of the vehicle and a longitudinal location which is a relative location in the travel direction of the vehicle are obtained. And on the basis of the relative location and the relative speed, a lateral speed which is a relative speed in the direction orthogonal to the travel direction of the vehicle and a longitudinal speed which is a relative speed in the travel direction of the vehicle are calculated.

At this time, the direction orthogonal to the travel direction of the vehicle can be referred to as a first direction, and the travel direction of the vehicle can be referred to as a second direction. The lateral speed can be said as a value indicating information about the object and therefore can be referred to as an object speed value; upon obtaining the lateral speed, the information obtainment unit 11 can be referred to as a speed obtainment unit.

A collision time calculation unit 12 calculates time to collision which is time estimated for the longitudinal location of the object indicating the relative distance between the vehicle and the object to reach zero. Specifically, the collision time calculation unit 12 divides the longitudinal location of the object by the longitudinal speed which is the relative speed between the vehicle and the object, and determines the resultant time as the time to collision. At this time, when the longitudinal speed is zero or when the longitudinal speed has a negative value (when the vehicle and the object are moving away from each other), the longitudinal location does not decrease, and thus the time to collision is not calculated. Note that upon calculation of this time to collision, assuming that the object moves with constant acceleration relative to the vehicle, the time to collision may be calculated using the relative acceleration in addition to the relative distance and the relative speed. In this case, even when the relative speed between the vehicle and the object has a negative value (when the vehicle and the object are moving away from each other at the time of calculation), the time to collision is calculated when the relative acceleration has a positive value (when the relative speed changes to the positive value side).

A region setting unit 13 sets an actuation region having a predetermined width in the lateral direction orthogonal to the travel direction of the vehicle. This actuation region is used to determine whether or not the lateral location of the object is where the safety device needs to be actuated. Specifically, when the lateral location of the object is within the actuation region, one condition for actuating the safety device is determined as having been satisfied. Upon setting this actuation region, the width of the actuation region is set greater as the lateral speed of the object increases. This is because even when the object is not located in the path of travel of the vehicle, the object is more likely to enter the path of travel of the vehicle and the driver is less likely to be able to recognize the object as the lateral speed of the object increases; thus, the safety device needs to be more easily actuated.

Note that the width of the actuation region may be the same or different for each function of the safety device. For example, the actuation region for the alarm device 31 is set to have the greatest width. This is because, if the driver realizes the danger of collision by the alarm device 31 and performs an operation to avoid the collision, the collision can be avoided without the object detection device 10 giving a control command to the braking device 32.

An actuation timing setting unit 14 sets actuation timing for the safety device. This actuation timing is compared with the above-described time to collision. Subsequently, when the location of the object is within the actuation region and the time to collision is less than or equal to the actuation timing, the safety device is actuated. In other words, as the actuation timing is set greater, the safety device is more easily actuated even when the time to collision is large; thus, the setting is such that the safety device is actuated early on.

This actuation timing has a value different for each function of the safety device. Specifically, the actuation timing for the alarm device 31 has the greatest value. This is because, if the driver realizes the danger of collision by the alarm device 31 and steps on the brake pedal, the collision can be avoided without the object detection device 10 giving a control command to the braking device 32. Note that the actuation timing for the braking device 32 is set separately for the brake assistance function and the automatic brake function. The actuation timing for these may have the same value or may have different values.

The actuation region and actuation timing will be described with reference to FIG. 2.

Figure 2:
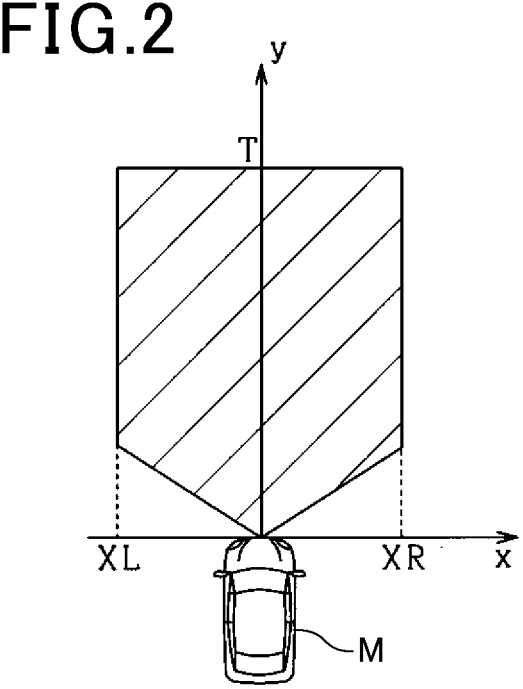
FIG. 2 is a diagram illustrating an actuation region.

In FIG. 2, the vertical axis (y-axis) represents the travel direction of a vehicle M, and the horizontal axis (x-axis) represents the direction orthogonal to the vertical axis. The actuation region has a predetermined width along the x-axis, and a right width XR and a left width XL which indicate respective widths of the right portion and the left portion of the actuation region have predetermined values for each type of the object. The actuation timing, denoted as T, is defined along the y-axis, and a value obtained by multiplying the actuation timing by the relative speed (longitudinal speed) between the vehicle M and the object indicates the location; thus, the longitudinal length of the actuation region depends on the value of the actuation timing T. The actuation timing T is also set in advance for each type of the object. Note that this actuation region is provided following the shape of a road along which the vehicle M is running. Specifically, the actuation region is set to have both edges parallel to the shape of the road when the vehicle M is running around a curved section of the road.

The actuation region set by the region setting unit 13 and the actuation timing set by the actuation timing setting unit 14 are input to an actuation determination unit 15. The actuation determination unit 15 determines whether or not the lateral location of the object is within the actuation region, and when the lateral location of the object is within the actuation region, determines that one condition for actuating the safety device has been satisfied. Likewise, the actuation determination unit 15 determines whether or not the time to collision is less than or equal to the actuation timing, and when the time to collision is less than or equal to the actuation timing, determines that one condition for actuating the safety device has been satisfied. Thereafter, when the actuation determination unit 15 determines that all the conditions for actuating the safety device have been satisfied, the actuation determination unit 15 transmits an actuation command to the safety device, causing the corresponding function of the safety device to be implemented.

In the case where the actuation region is set and the safety device is actuated on the basis of the actuation region as described above, when an error occurs at the time of detection of the lateral speed of the object and a value greater than an actual lateral speed is obtained, the width of the actuation region is set greater than necessary. Accordingly, the object is more likely to be located within the actuation region, and thus there is an increased possibility of unnecessary actuation of the safety device.

Figure 3:
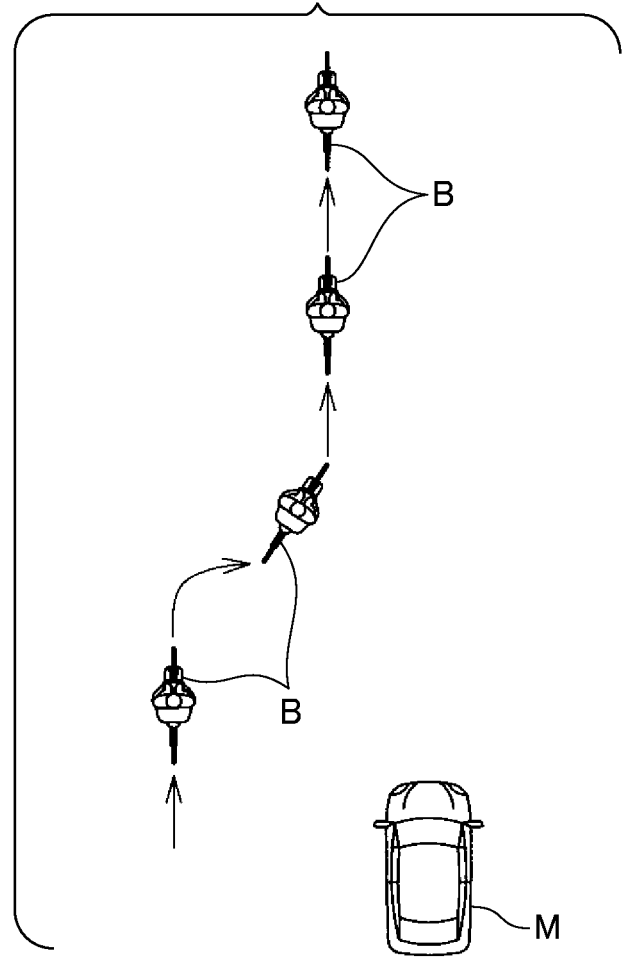
FIG. 3 is a diagram illustrating an example in which an object is cutting into a path of travel of a vehicle.

Particularly, as shown in FIG. 3, a bicycle B (hereinafter also referred to as an object B) which is an object is running diagonally forward of the vehicle M in the travel direction thereof, and when the bicycle B is cutting into the path of travel of the vehicle M, the lateral location of the bicycle B laterally moves from a location close to the path of travel of the vehicle M. Therefore, a value of the lateral speed greater than the actual value thereof is detected; when the width of the actuation region is set greater than necessary, the lateral location of the object is more likely to be included in the actuation region, and thus there is an increased possibility of unnecessary actuation of the safety device. Furthermore, in the case as shown in FIG. 3 where the bicycle B which is an object is running diagonally forward of the vehicle M in the travel direction thereof, the driver of the vehicle M is highly likely to be aware of the presence of the bicycle B. Therefore, if the driver of the vehicle M judges that there is a risk of collision, the driver will perform an operation to avoid the collision; thus, if the safety device is actuated, the driver would be annoyed by such actuation.

In order to reduce such unnecessary actuation of the safety speed due to erroneous detection of the lateral speed of the object, an angle obtainment unit 16 and an upper limit setting unit 17 included in the object detection device 10 set an upper limit value of the lateral speed of the object, and when the detected lateral speed is greater than the upper limit value, performs a process of limiting the value of the lateral speed to the upper limit value.

On the basis of an image of the object obtained from the imaging device 22, the angle obtainment unit 16 obtains, as angle information, a relative angle of a moving direction of the object with respect to a moving direction of the vehicle. Specifically, one or more template images are stored in advance for angles (attitude angles) representing the attitude of the object relative to the vehicle M. Thereafter, the angle obtainment unit 16 performs template matching between such template images and the image of the object and defines the attitude angle associated with the template image having the highest similarity as the relative angle between the moving direction of the vehicle M and the moving direction of the object. Note that the value of the relative angle can be said as the relationship indicating the angle.

Figure 4:
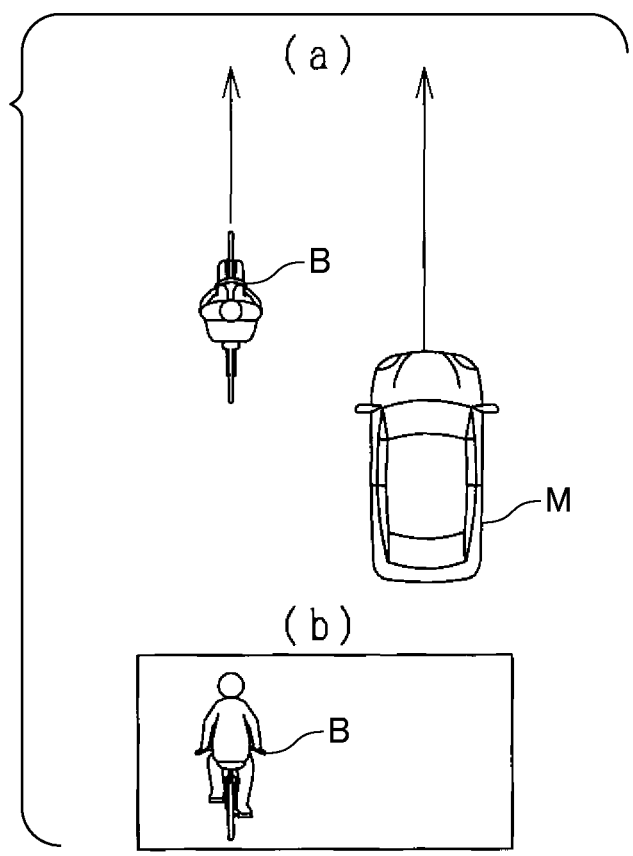
FIG. 4 is a diagram showing, in (a) and (b), the relative angle and the shape of an object when the relative angle is zero degrees.

As shown in (a) in FIG. 4, when the travel direction of the vehicle M and the travel direction of the object B are the same, the directions of travel do not intersect each other, and the relative angle, denoted as θ, is defined as 0 degrees. In this case, the image of the object B obtained from the imaging device 22 is an image of the object B captured from behind, as shown in (b) in FIG. 4.

Figure 5:
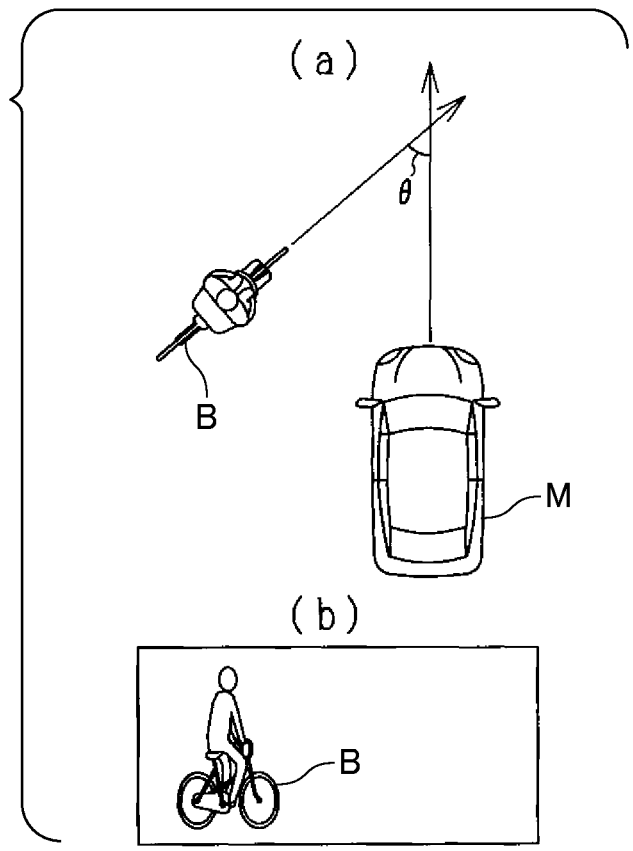
FIG. 5 is a diagram showing, in (a) and (b), the relative angle and the shape of an object when the relative angle is 45 degrees.

FIG. 5 shows, in (a), an example in which the object B travels diagonally with respect to the moving direction of the vehicle M where the relative angle θ is 45 degrees. In this case, the image of the object B obtained from the imaging device 22 is an image of the object B captured from diagonally rearward thereof, as shown in (b) in FIG. 5.

Figure 6:
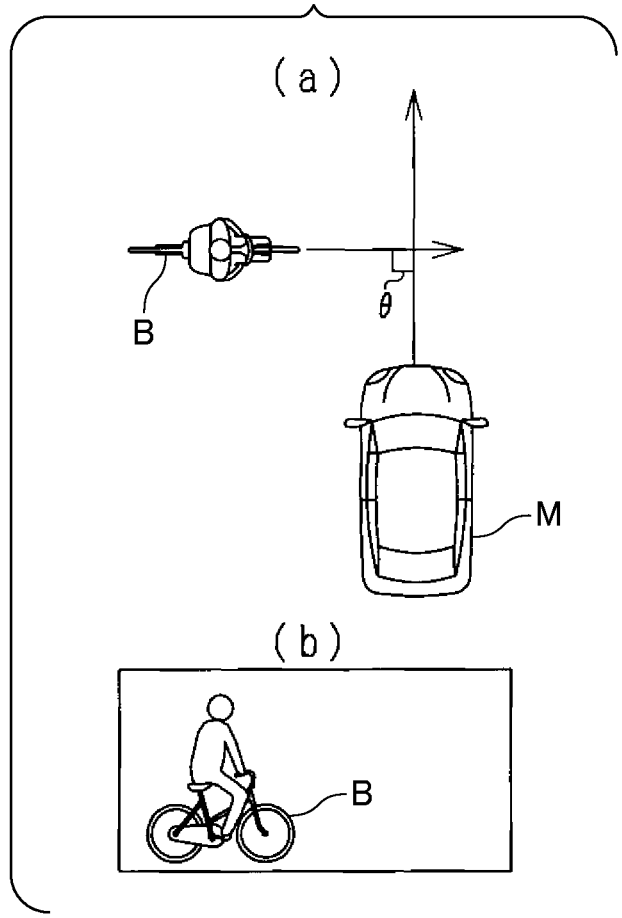
FIG. 6 is a diagram showing, in (a) and (b), the relative angle and the shape of an object when the relative angle is 90 degrees.

FIG. 6 shows, in (a), an example in which the object B travels orthogonally with respect to the moving direction of the vehicle where the relative angle θ is 90 degrees. In this case, the image of the object B obtained from the imaging device 22 is an image of the object B captured from the side, as shown in (b) in FIG. 6.

In other words, as shown in (b) in FIG. 4, (b) in FIG. 5, and (b) in FIG. 6, the captured image is different according to the relative angle between the travel direction of the vehicle M and the travel direction of the object B. Thus, using this, the relative angle is determined by the template matching.

When the object B is a bicycle, the template image may be provided for the person riding the bicycle or may be provided for the bicycle or one template image may be provided collectively for the person and the bicycle. The template image is provided at intervals of a predetermined angle. Here, the intervals of the relative angle at which the template image is provided may be regular or may be irregular. In this way, the template image is provided at intervals of the predetermined angle in such a way that the template image and the relative angle are associated with each other; thus, for example, when the actual relative angle is 35 degrees, the image of the object B is highly likely to have the highest similarity with the template image at 30 degrees, and it is most likely that the relative angle is determined as 30 degrees.

Figure 7:
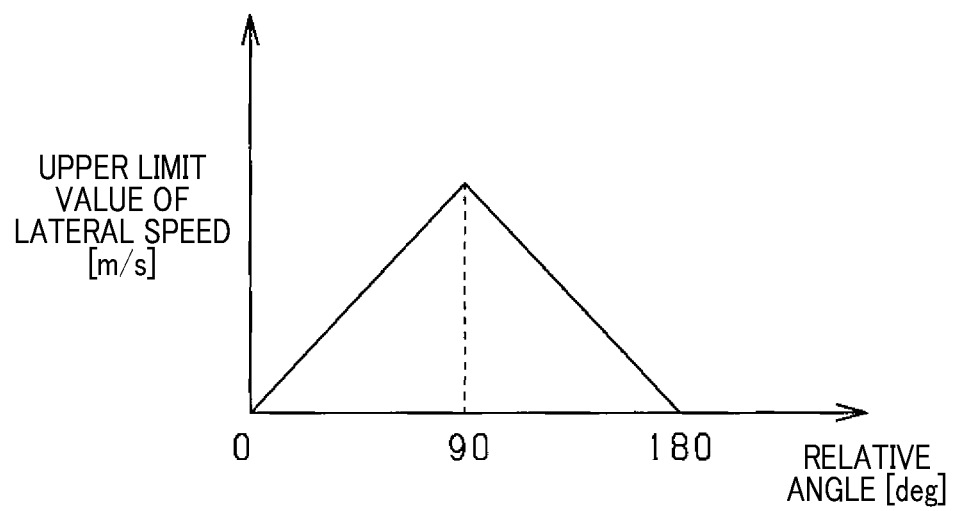
FIG. 7 is a diagram showing the relationship between the upper limit value of the lateral speed and the relative angle.

When the angle obtainment unit 16 obtains the relative angle in this way, the relative angle is input to the upper limit setting unit 17. The upper limit setting unit 17 sets the upper limit value of the lateral speed on the basis of the relative angle. Here, the relationship between the upper limit value of the lateral speed and the relative angle is shown in FIG. 7. In FIG. 7, the relative angle is defined as 90 degrees when the travel direction of the vehicle M and the travel direction of the object B are orthogonal to each other, the relative angle is defined as 0 degrees when the travel direction of the vehicle M and the travel direction of the object B are the same, and the relative angle is defined as 180 degrees when the travel direction of the vehicle M and the travel direction of the object B are opposite to each other. In the case where the speed of the object B in the travel direction thereof is constant, the lateral speed of the object B is highest when the relative angle is 90 degrees, the lateral speed of the object B decreases as the relative angle approaches 0 degrees and as the relative angle approaches 180 degrees, and the lateral speed of the object B is zero when the relative angle is 0 degrees and when the relative angle is 180 degrees.

The relationship between the relative angle and the upper limit value of the lateral speed shown in FIG. 7 is determined for each type of the object B, and is stored in advance in the ROM included in the object detection device 10. In other words, the upper limit of the possible speed on a road is predetermined for each type of the object B as the maximum speed according to laws and regulations, empirical rules, and the like, and the maximum speed is set as the upper limit value of the lateral speed for when the relative angle is 90 degrees. For example, when the object B is a bicycle, the maximum speed for when the relative angle is 90 is, for example, set to a value of approximately 10 m/s.

Note that as described above, upon determining the relative angle, the template image is provided at intervals of the predetermined angle, and therefore a table in which the values of the relative angle and the values of the lateral speed are associated may be stored.

When the upper limit setting unit 17 obtains the upper limit value of the lateral speed of the object, the upper limit value is output to the region setting unit 13. When the lateral speed obtained from the information obtainment unit 11 is greater than the upper limit value, the region setting unit 13 sets the actuation region by using the upper limit value as the lateral speed. When the lateral speed is less than or equal to the upper limit value, the region setting unit 13 sets the actuation region by using the value of the obtained lateral speed.

Figure 8:
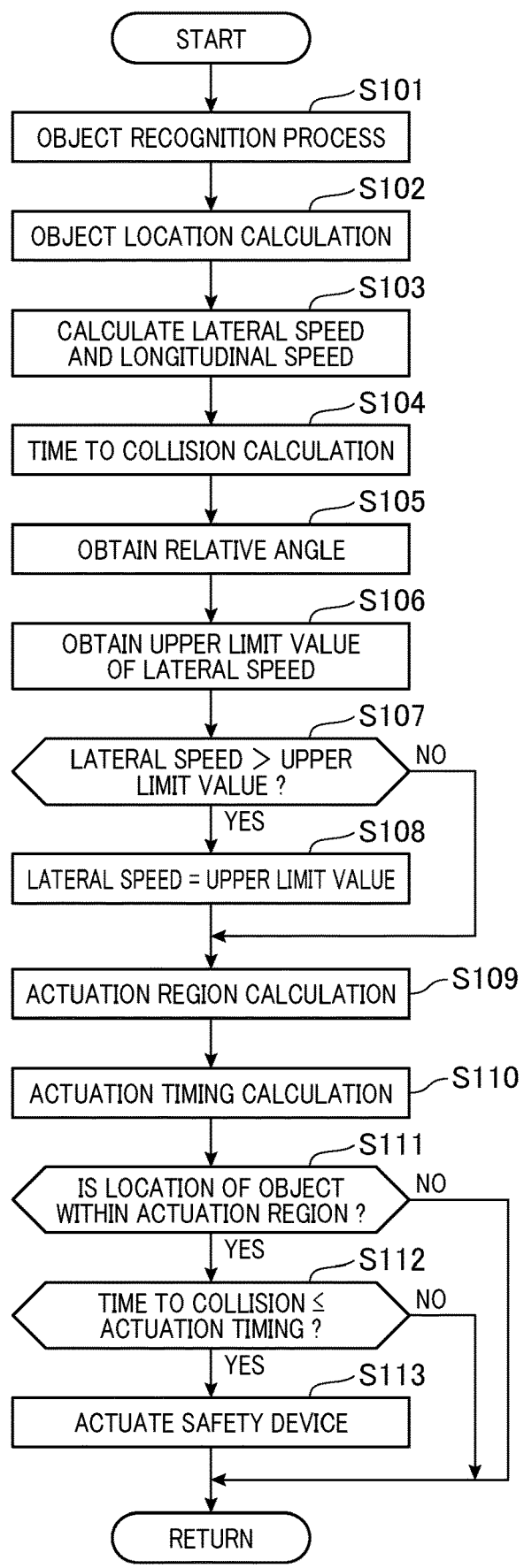
FIG. 8 is a flowchart showing a process which an object detection device performs.

An object detection method which is a series of processes which the object detection device 10 configured as described above performs will be described with reference to the flowchart in FIG. 8. The process in the flowchart shown in FIG. 8 is repeated on a predetermined control cycle.

First, the information obtainment unit 11 obtains the detection information from the measurement device 21 and the imaging device 22, performs an object recognition process (S101), calculates the location of each object (S102), and calculates the longitudinal speed and the lateral speed (S103). Subsequently, the collision time calculation unit 12 calculates the time to collision on the basis of the location and the longitudinal speed (S104).

Next, on the basis of the image obtained from the imaging device 22, the angle obtainment unit 16 obtains the relative angle in the travel direction of the object with respect to the travel direction of the vehicle (S105), and the upper limit setting unit 17 obtains the upper limit value of the lateral speed according to the relative angle (S106).

When the upper limit value of the lateral speed is obtained, whether or not the lateral speed obtained from the result of measurement by the measurement device 21 is greater than the upper limit value is determined (S107). In other words, whether or not the result of measurement by the measurement device 21 has a value significantly different from the actual possible lateral speed is determined. When the lateral speed is greater than the upper limit value (S107: YES), the upper limit value is used as the value of the lateral speed (S108). On the other hand, when the lateral speed is less than or equal to the upper limit value (S107: NO), the lateral speed is not significantly different from the actual possible value and can be said as being detected correctly or with small error, and thus the value of the obtained lateral speed is used.

When the value of the lateral speed is obtained in this way, the actuation region is calculated on the basis of the lateral speed (S109), and the actuation timing is calculated (S110).

When the actuation region is set as described above, whether or not the location of the object is within the actuation region is determined (S111). When the location of the object is within the actuation region (S111: YES), one condition for actuating the safety device has been satisfied, and thus whether or not the time to collision is less than or equal to the actuation timing is subsequently determined (S112).

When the time to collision is less than or equal to the actuation timing (S112: YES), because all the conditions for actuating the safety device have been satisfied, the safety device is actuated (S113), and the series of processes ends. On the other hand, when the location of the object is not within the actuation region (S111: NO) or when the time to collision is not less than or equal to the actuation timing (S112: NO), because at least one condition for actuating the safety device has not been satisfied, the series of processes ends without the safety device being actuated.

With the abovementioned configuration, the object detection device 10 according to the present embodiment produces the following effects.

When the lateral speed of the object is detected by transmitting the probe waves and receiving the reflected waves, there may be an error in the result of detection due to, for example, variations in location detection. In this regard, in the present embodiment, focusing on the feature that the maximum value of the lateral speed is determined according to the relative angle between the travel direction of the vehicle and the travel direction of the object, the relative angle is determined from the image obtained by the imaging device 22, and the upper limit value is set for the lateral speed according to the relative angle. Thus, when there is such erroneous detection that the result of detection of the lateral speed is significantly different from the upper limit value of the lateral speed, the result of detection can be accurately corrected.

For the lateral speed obtained on the basis of the result of measurement by the measurement device 21, the upper limit value is set according to the result of imaging by the imaging device 22; thus, the measurement device 21 which is prone to numerical detection error in the lateral direction can be complemented by the functions of the imaging device 22.

The relationship between the upper limit value of the lateral speed and the relative angle is set in advance for each type of the object, and thus even if not only the lateral speed of the object, but also the speed in the travel direction are erroneously detected, the lateral speed can be limited to the upper limit value or less. Accordingly, erroneous detection of the lateral speed can be more accurately suppressed.

The width of the actuation region is changed according to the lateral speed of the object, and thus the unnecessary actuation of the safety device can be reduced by suppressing the erroneous detection of the lateral speed.

Variations

In the embodiment, the upper limit value of the lateral speed is made highest when the relative angle is 90 degrees, and is set to gradually linearly decrease as the relative angle changes to 0 degrees and 180 degrees; this relationship between the upper limit value of the lateral speed and the relative angle is not limited to that described in the embodiment. For example, the upper limit value of the lateral speed may be changed stepwise.

Furthermore, since the lateral speed is determined by multiplying the speed in the travel direction by the sine, the upper limit value of the lateral speed may be based on a sine wave that has a local maximum value when the relative angle is 90 degrees, and is 0 when the relative angle is 0 degrees and 180 degrees. Alternatively, other setting methods may be used.

In the embodiment, when the relative angle is 0 degrees and when the relative angle is 180 degrees, the upper limit value of the lateral speed is 0, but may be a value greater than 0.

As described in the embodiment, the template image provided at intervals of the predetermined angle is used to determine the relative angle, and thus when the relative angle is determined as 0 degrees, the actual relative angle is 0 degrees or a value in the vicinity of 0 degrees.

Therefore, a value greater than 0 is frequently detected as the lateral speed.

The object detection device 10 according to the embodiment is configured to, when a value significantly different from the actual value is detected as the value of the lateral speed, eliminate the detected value; thus, a value approximate to the actual lateral speed need not be eliminated. Therefore, the upper limit value of the lateral speed may be greater than 0, as described above, when the relative angle is 0 degrees and when the relative angle is 180 degrees.

In the embodiment, as the relationship between the relative angle and the upper limit value of the lateral speed, the upper limit value is set highest when the relative angle is 90 degrees, and changes at the same rate when the relative angle approaches 0 degrees and when the relative angle approaches 180 degrees, but this rate of change does not need to be equal.

Erroneous detection of the lateral speed of the object is particularly problematic when the object B is cutting into the path of travel of the vehicle M, such as the case shown in FIG. 3; in this case, the relative angle between the travel direction of the vehicle M and the travel direction of the object B has a value closer to 0 degrees than to 90 degrees.

Figure 9:
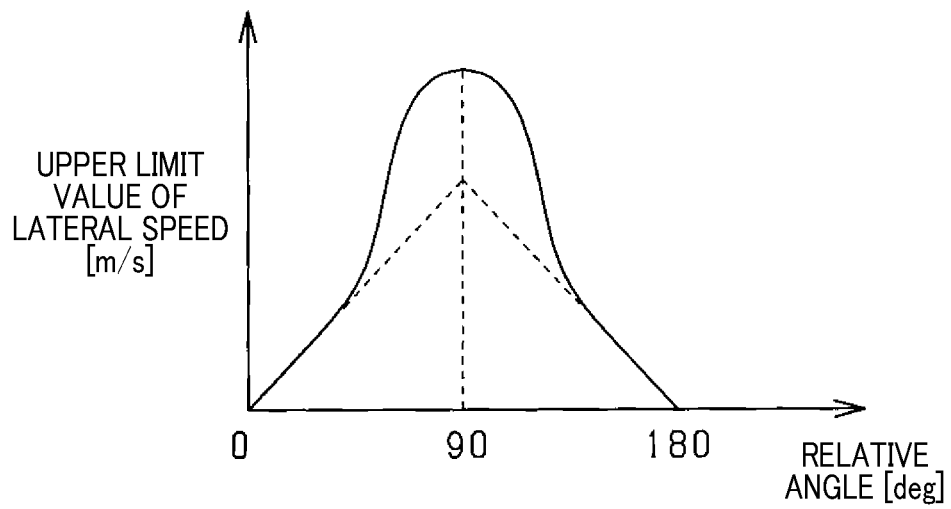
FIG. 9 shows another example of the relationship between the upper limit value of the lateral speed and the relative angle.

Therefore, the relationship between the relative angle and the upper limit value of the lateral speed may be the relationship shown in FIG. 9.

Specifically, the upper limit value may be set as in the embodiment when the relative angle is in the range close to 0 degrees so that the lateral speed is easily set to the upper limit value when erroneous detection of the lateral speed occurs, while, the upper limit value may be set greater than the maximum speed when the relative angle is in the range close to 90 degrees so that the situation in which the lateral speed becomes greater than the maximum speed is reduced.

Figure 10:
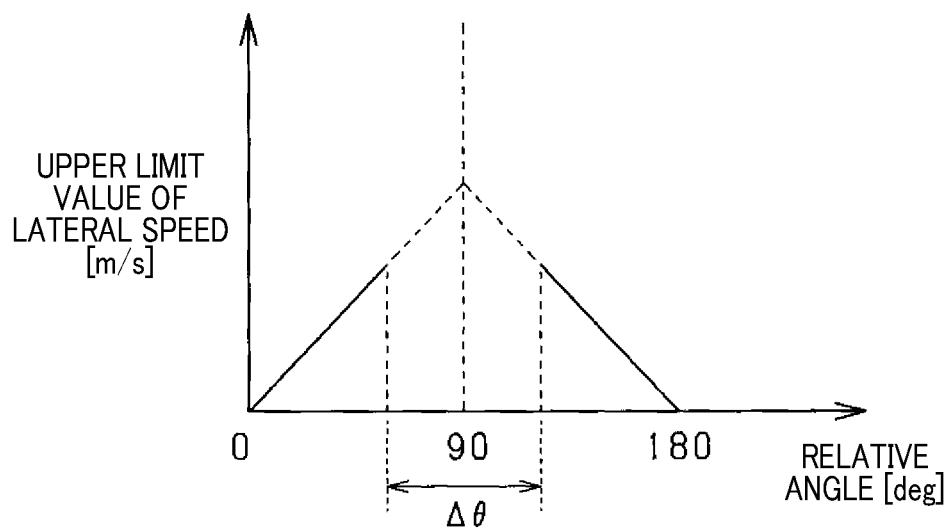
FIG. 10 shows another example of the relationship between the upper limit value of the lateral speed and the relative angle.

As shown in FIG. 10, there may be no upper limit value of the lateral speed for a predetermined range $\Delta\theta$ around 90 degrees. In FIGS. 9 and 10, the dashed lines indicate the relationship between the relative angle and the upper limit value of the lateral speed according to the embodiment.

In the embodiment, the relative angle formed when the moving direction of the vehicle and the moving direction of the object are orthogonal to each other is defined as 90 degrees, but how the value of the angle is defined is optional.

For example, the relative angle formed when the moving direction of the vehicle and the moving direction of the object are orthogonal to each other may be defined as 0 degrees.

In the embodiment, the relationship between the upper limit value of the lateral speed and the relative angle is stored in the storage unit in advance for each type of the object, and the value of the relative angle is read from the storage unit on the basis of the type and the relative angle of the detected object.

In this regard, the upper limit value of the lateral speed may be set on the basis of the speed of the object in the travel direction thereof.

In the embodiment, the width of the actuation region is set using the lateral speed.

In this regard, as described in the embodiment, the object is more likely to enter the path of travel of the vehicle and the driver is less likely to be able to recognize the object as the lateral speed of the object increases.

Thus, the actuation timing for the safety device may be set to a greater value as the lateral speed increases so that the safety device is actuated even when the longitudinal distance is large.

In the embodiment, the relative angle formed between the travel direction of the vehicle and the travel direction of the object is determined between 0 degrees and 180 degrees, but the relative angle may be determined also when the travel direction of the object moves away in the lateral direction, and the upper limit value may be set as well for the lateral speed in the direction in which the object is moving away.

In the embodiment, the relative angle formed between the travel direction of the vehicle and the travel direction of the object is determined on the basis of the image obtained by the imaging device 22, but other methods may be used to determine the relative angle.

For example, the travel direction may be determined from a location history of the object.

In the embodiment, the relative angle of the travel direction of the object with respect to the travel direction of the vehicle is determined, but obtaining the relative angle is not an essential feature.

Specifically, instead of the relative angle, the upper limit value of the lateral speed may be associated with the template image to be used for the template matching so that the upper limit value of the lateral speed is obtained without obtaining the relative angle.

Also in this case, the upper limit value of the lateral speed is obtained according to the relationship between the travel direction of the vehicle and the travel direction of the object; thus, the angle obtainment unit 16 can also be called a relationship obtainment unit.

In the embodiment, the speed of the object in a direction orthogonal to the travel direction of the vehicle is denoted as the lateral speed, and the upper limit value of the lateral speed is determined using the angle formed between the travel direction of the vehicle and the travel direction of the object.

In this regard, the speed of the object in a direction orthogonal to a predetermined direction of the vehicle, instead of the travel direction of the vehicle, may be denoted as the lateral speed, and the upper limit value of the lateral speed is determined using the angle formed between the predetermined direction of the vehicle and the travel direction of the object. In this case, the vehicle may be in motion or not in motion.

In the embodiment, the object is exemplified by a bicycle, but the same can apply to a moving body present around the vehicle such as pedestrians, motorcycles, and automobiles.

In the embodiment, the width of the actuation region for the safety device is set using the lateral speed of the object, but the usage of the lateral speed is not limited to this one.

For example, the functions of the object detection device 10 according to the embodiment may be used to implement the function of allowing the vehicle to follow another vehicle running ahead in the travel direction.

In the embodiment and the abovementioned variations, the upper limit value is set assuming that the lateral speed of the object is the object speed value, and the width of the region is set using the lateral speed.

In this regard, instead of the lateral speed of the object, a lateral acceleration which is an acceleration in the lateral direction may be obtained as the object speed value, and an upper limit value may be set for the lateral acceleration, and the width of the region may be set using the lateral acceleration.

In this case, the upper limit value set for when the relative angle is 90 degrees may be the maximum acceleration.

Furthermore, both the lateral speed and the lateral acceleration of the object may be obtained as the object speed value, and an upper limit value may be set for each of the lateral speed and the lateral acceleration.

In the embodiment, the object detection device 10 is mounted on the vehicle, but the object on which the object detection device 10 is mounted is not limited to vehicles; the object detection device 10 may be mounted on various moving bodies.

Furthermore, the object on which the object detection device 10 is mounted is not limited to the moving bodies, and may be a stationary object.

In this case, the object detection device 10 may be used as a device for monitoring the moving direction and the moving speed of an object around the object on which the object detection device 10 is mounted.

The present disclosure is described in accordance with the embodiment, but the present disclosure should in no way be construed as being limited to the embodiment, the configuration, etc.

The present disclosure encompasses various variations and modifications made within the range of equivalence.

In addition, various combinations and forms, and furthermore, other combinations and forms including only one element of these and elements no less than or no more than these are also included in the scope or concept range of the present disclosure.

PARTIAL REFERENCE SIGNS LIST

10 . . . Object detection device
11 . . . Information obtainment unit
13 . . . Region setting unit
16 . . . Angle obtainment unit
17 . . . Upper limit setting unit
21 . . . Measurement device
22 . . . Imaging device

The invention claimed is:

1. An object detection device which detects an object moving in an area surrounding an own object provided with the object detection device, comprising:
   an information obtainment unit configured to obtain at least an object speed value that is least one of a speed and an acceleration of the object in a lateral direction which is orthogonal to a predetermined direction of the area, based on a result of measurement performed by a measurement device which transmits probe waves to a surrounding area and receives reflected waves from the object;
   an upper limit setting unit configured to set an upper limit value of the object speed value on the basis of angle information showing a relationship indicating an angle of a moving direction of the object with respect to the predetermined direction;
   a speed determination unit configured to determine the speed of the object in the lateral direction; and
   a setting unit configured to set an actuation region based on the upper limit value,
   wherein
   in response to the speed determination unit determining that the object speed value in the lateral direction obtained by the information obtainment unit is greater than the upper limit value that is set by the upper limit setting unit, the setting unit sets a lateral speed of the object based on the upper limit value such that the upper limit value is set as the lateral speed of the object, and
   in response to the speed determination unit determining that the object speed value in the lateral direction obtained by the information obtainment unit is less than or equal to the upper limit value, the setting unit sets the lateral speed of the object based on the object speed value obtained by the information obtainment unit, such that the speed of the object in the lateral direction is the object speed value obtained from the information obtainment unit.

2. The object detection device according to claim 1, wherein the upper limit setting unit is configured to obtain a type of the object and set the upper limit on the basis of the type obtained and the relationship indicating the angle of the moving direction of the object with respect to the predetermined direction.

3. The object detection device according to claim 2, wherein the information obtainment unit is configured to obtain at least one of a maximum speed and a maximum acceleration in the moving direction, which is predetermined for each type of the object, and when the relationship indicates inclusion in a predetermined angle range including an orthogonal relationship, the upper limit setting unit is configured to set the upper limit value to a value greater than the at least one of the maximum speed and the maximum acceleration.

4. The object detection device according to claim 2, wherein the type of the object includes a bicycle.

5. The object detection device according to claim 2, wherein the upper limit setting unit is configured to set the upper limit to a smaller value as the relationship between the predetermined direction and the moving direction of the object becomes closer to parallel.

6. The object detection device according to claim 2, wherein the own object is a moving body,
   the information obtainment unit is configured to obtain the object speed value of the object moving toward the moving body in a lateral direction orthogonal to a moving direction of the moving body, and
   the upper limit setting unit is configured to set the upper limit of the object speed value on the basis of angle information that is a relationship indicating a relative angle of the moving direction of the object with respect to the moving direction of the moving body.

7. The object detection device according to claim 1, wherein the upper limit setting unit is configured to set the upper limit to a smaller value as the relationship between the predetermined direction and the moving direction of the object becomes closer to parallel.

8. The object detection device according to claim 1, wherein the own object is a moving body,
   the information obtainment unit is configured to obtain the object speed value of the object moving toward the moving body in a lateral direction orthogonal to a moving direction of the moving body, and
   the upper limit setting unit is configured to set the upper limit of the object speed value on the basis of angle information that is a relationship indicating a relative angle of the moving direction of the object with respect to the moving direction of the moving body.

9. The object detection device according to claim 8, wherein the setting unit is configured to set a region having a width ahead of the moving body in the moving direction of the moving body; and a determination unit is configured to, when the object is located within the region, determine that the moving body and the object are likely to collide, and wherein the setting unit is configured to set the width of the region greater as the object speed value increases.

10. An object detection device which detects an object moving in an area, surrounding an own object provided with the object detection device, comprising:
    an information obtainment unit configured to obtain at least an object speed value that is at least one of a speed and an acceleration of the object in a lateral direction which is orthogonal to a predetermined direction of the area surrounding the own object and information from an imaging device;
    an angle obtainment unit configured to previously store therein one or more template images for attitude angles each indicating an attitude of the object to the predetermined direction, obtain an image of the object from the imaging device which images the area, and perform template matching between the one or more template images and the image of the object to define an attitude angle corresponding to the template image having a highest similarity to the image of the object,
    an upper limit setting unit configured to set an upper limit value of the object speed value on the basis of angle information that is a relationship indicating an angle of a moving direction of the object with respect to the predetermined direction;
    a speed determination unit configured to determine the speed of the object in the lateral direction; and
    a setting unit configured to set an actuation region based on the upper limit value, wherein in response to the speed determination unit determining that the object speed value in the lateral direction obtained by the information obtainment unit is greater than the upper limit value which is set by the upper limit setting unit, the setting unit sets a lateral speed of the object based on the upper limit value such that the upper limit value is set as the lateral speed of the object, and in response to the speed determination unit determining that the object speed value in the lateral direction obtained by the information obtainment unit is less than or equal to the upper limit value, the setting unit sets the lateral speed of the object based on the object speed value obtained by the information obtainment unit, such that the speed of the object in the lateral direction is the object speed value obtained from the information obtainment unit, and wherein the upper limit setting unit obtains a type of the object based on pattern matching between the one or more template images and the image and sets the upper limit value on the basis of the type of the object, and wherein at least one of a maximum speed and a maximum acceleration in the moving direction is predetermined for each type of the object, and when the relationship indicates inclusion in a predetermined angle range including an orthogonal relationship, the upper limit setting unit is configured to set the upper limit value to a value greater than the at least one of the maximum speed and the maximum acceleration.

11. The object detection device according to 10, wherein the information obtainment unit is configured to obtain at least the object speed value on the basis of a result of measurement by a measurement device which transmits a probe wave to a surrounding area and receives a reflected wave that is a wave reflected from the object, and the upper limit setting unit obtains the image of the object from the imaging device which captures an image of the surrounding area, and obtains the angle information on the basis of the image.

12. The object detection device according to claim 10, wherein the upper limit setting unit is configured to set the upper limit to a smaller value as the relationship between the predetermined direction and the moving direction of the object becomes closer to parallel.

13. The object detection device according to claim 10, wherein the own object is a moving body, the information obtainment unit is configured to obtain the object speed value, of the object moving toward the moving body in a lateral direction orthogonal to a moving direction of the moving body, and the upper limit setting unit is configured to set the upper limit of the object speed value on the basis of angle information that is a relationship indicating a relative angle of the moving direction of the object with respect to the moving direction of the moving body.

14. An object detection method performed by an object detection device which detects an object moving in an area surrounding an own object, provided with the object detection device, comprising:

an information obtainment step bar obtaining at least an object speed value that is at least one of a speed and an acceleration of the object in a lateral direction which is orthogonal to a predetermined direction of the area surrounding the own object, based on a result of measurement performed by a measurement device which transmits a probe wave to a surrounding area and receives a reflected wave of the probe wave reflected from the object;

an upper limit setting step for setting an upper limit value of the object speed value on the basis of angle information that is a relationship indicating an angle of a moving direction of the object with respect to the predetermined direction;

a speed determination step for determining the speed of the object in the lateral direction; and a setting step for setting an actuation region based on the upper limit value, wherein in response to the speed determination step determining that the object speed value in the lateral direction obtained b the information obtainment step is greater than the upper limit value which is set by the upper limit setting step, the setting step sets a lateral speed of the object based on the upper limit value such that the upper limit value is set as the lateral speed of the object, and in response to the speed determination step determining that the object speed value in the lateral direction obtained by the information obtainment step is less than or equal to the upper limit value, the setting step sets the lateral speed of the object based on the object speed value obtained by the information obtainment step, such that the speed of the object in the lateral direction is the object speed value from the information obtainment step.

15. An object detection method performed by an object detection device, which detects an object moving in an area surrounding an own object, provided with the object detection device, comprising:

an information obtainment step for obtaining at least an object speed value that is at least one of a speed and an acceleration of the object in a lateral direction which is orthogonal to a predetermined direction of the area surrounding the own object;

an angle obtainment step for previously storing one or more template images for attitude angles each indicating an attitude of the object to the predetermined direction, obtaining an image of the object from an imaging device which images the area, and perform template matching between the one or more template images and the image of the object to define an attitude angle corresponding to the template image having a highest similarity to the image of the object;

an upper limit setting step for obtaining a type of the object and setting an upper limit value of the object speed value obtained at the information obtainment step on the basis of both angle information that is a relationship indicating an angle of a moving direction of the object with respect to the predetermined direction and the obtained type;

a speed determination step for determining the speed of the object in the lateral direction; and a setting step for setting an actuation region based on the upper limit value, wherein in response to the speed determination step determining that the object speed value in the lateral direction obtained at the information obtainment step is greater than the upper limit value which is set by the upper limit setting step, the setting step sets a lateral speed of the object based on the upper limit value such that the upper limit value is set as the lateral speed of the object, and in response to the speed determination step determining that the object speed value in the lateral direction obtained at the information obtainment step is less than or equal to the upper limit value, the setting step sets the lateral speed of the object based on the object speed value obtained by the information obtainment step, such that the speed of the object in the lateral direction is the object speed value obtained at the information obtainment step, wherein at least one of a maximum speed and a maximum acceleration in the moving direction is predetermined for each type of the object, and wherein, in response to the relationship indicating inclusion in a predetermined angle range including an orthogonal relationship, the upper limit setting step sets the upper limit value to a value greater than the at least one of the maximum speed and the maximum acceleration.

\* \* \* \* \*